UNITED STATES PATENT OFFICE.

AUGUST LUTHER, OF NIED-ON-THE-MAIN, AND CARL OSKAR MÜLLER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

RED AZO DYESTUFFS AND PROCESS OF MAKING SAME.

1,065,950. Specification of Letters Patent. Patented July 1, 1913.

No Drawing. Application filed July 15, 1912. Serial No. 709,541.

*To all whom it may concern:*

Be it known that we, AUGUST LUTHER, Ph. D., Chemist, and CARL OSKAR MÜLLER, Ph. D., chemist, citizens of the Empire of Russia and the Empire of Germany, respectively, residing at Nied-on-the-Main, Germany, and Höchst-on-the-Main, Germany, respectively, have invented certain new and useful Improvements in Red Azo Dyestuffs and Processes of Making Same, of which the following is a specification.

In U. S. Patent No. 888837 are described dyestuffs of the general constitution: diazo compound + p - aminobenzoyl - 2.5.7 - aminonaphthol - sulfonic acid + p - amiobenzoyl- 2.5.7-aminonaphtholsulfonic acid. Now we have found that red disazo dyestuffs of great value may also be obtained by substituting in the disazo dyestuffs, obtained according to U. S. Patent No. 888837, for one molecule of the p-aminobenzoyl-2.5.7-aminonaphtholsulfonic acid, one molecule of the p-aminobenzoyl - 3.5.7 - aminonaphtholsulfonic acid. The dyestuffs thus obtained correspond to the formula:

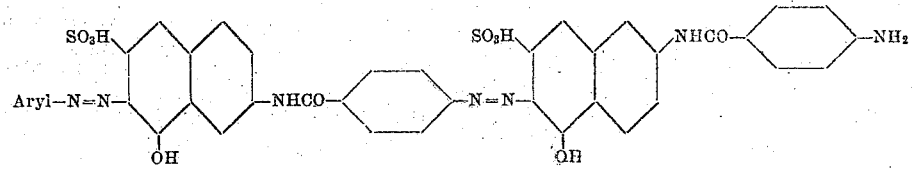

They form greenish powders, readily soluble in hot water and concentrated sulfuric acid with a red color, difficultly soluble in alcohol, dyeing unmordanted cotton red tints.

The following example illustrates our invention:

Example I: The dyestuff obtained from 10.7 kilos of p-toluidin, diazotized, and 38 kilos of p-aminobenzoyl - 3.5.7 - aminonaphtholsulfonic acid is stirred in water so as to form a thin paste, in which 8 kilos of nitrite are dissolved. There are then added 35 kilos of hydrochloric acid of 30% strength, so that the temperature rises to 18-20° C. The whole is then stirred at this temperature for one hour and the diazo compound thus obtained is run into a solution of 40 kilos of p-aminobenzoyl-2.5.7. aminonaphtholsulfonic acid and 35 kilos of sodium carbonate. After having stirred the whole for about 24 hours, the formation of the dyestuff is complete, whereupon it is salted out, filtered, pressed and dried. The dyestuff thus obtained has the formula:

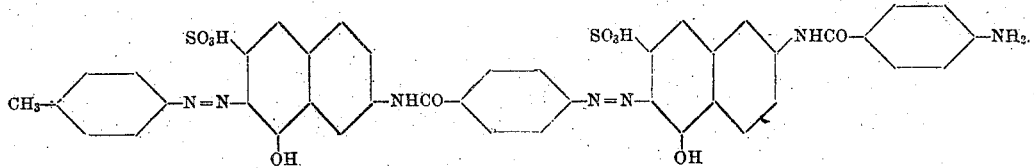

It readily dissolves in hot water to a red solution and dyes unmordanted cotton beautiful red tints. By developing the dyeings with β-naphthol, bright-red tints are obtained.

Having now described our invention, what we claim is:

1. The process of manufacturing new azo dyestuffs, which consists in further diazotizing the dyestuff obtained by combining a diazo compound with para-aminobenzoyl-3.5.7-aminonaphtholsulfonic acid, and combining it with one molecular proportion of para-aminobenzoyl-2.5.7-aminonaphtholsulfonic acid.

2. As new products, the azo dyestuffs of the general constitution:

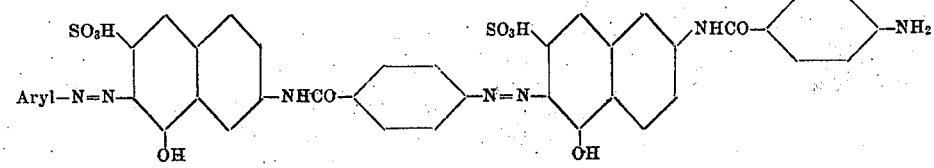

being in a solid state a green powder, readily soluble in hot water and concentrated sulfuric acid with a red color, difficultly soluble in alcohol, dyeing unmordanted cotton red tints.

3. As a new product, the azo dyestuff of the constitution:

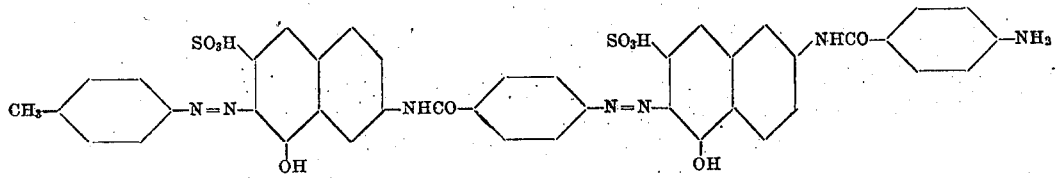

being in a solid state a green powder, readily soluble in hot water and concentrated sulfuric acid with a red color, difficultly soluble in alcohol, dyeing unmordanted cotton red tints.

In testimony whereof, we affix our signatures in presence of two witnesses.

AUGUST LUTHER.
CARL OSKAR MÜLLER.

Witnesses:
JEAN GRUND,
CARL GRUND.